United States Patent
Smith

(10) Patent No.: US 10,083,767 B2
(45) Date of Patent: Sep. 25, 2018

(54) METHOD AND APPARATUS FOR INSPECTION OF COOLING TOWERS

(71) Applicant: EPSCO Limited, Perth (GB)

(72) Inventor: Stuart Oliver Smith, Kinclaven (GB)

(73) Assignee: EPSCO, Ltd., Perth (GB)

( * ) Notice: Subject to any disclaimer, the term of this patent is extended or adjusted under 35 U.S.C. 154(b) by 537 days.

(21) Appl. No.: 14/437,875

(22) PCT Filed: Nov. 1, 2013

(86) PCT No.: PCT/GB2013/052857
§ 371 (c)(1),
(2) Date: Apr. 23, 2015

(87) PCT Pub. No.: WO2014/068325
PCT Pub. Date: May 8, 2014

(65) Prior Publication Data
US 2015/0279488 A1     Oct. 1, 2015

(30) Foreign Application Priority Data

Nov. 2, 2012    (GB) .................................. 1219764.6

(51) Int. Cl.
*G01S 13/04*      (2006.01)
*G21C 17/00*      (2006.01)
(Continued)

(52) U.S. Cl.
CPC .............. *G21C 17/00* (2013.01); *F28F 19/00* (2013.01); *F28F 25/00* (2013.01); *F28F 27/003* (2013.01); *F28G 15/003* (2013.01); *G01S 13/885* (2013.01)

(58) Field of Classification Search
CPC ........ G01S 13/885; G01S 13/89; G21C 17/00
(Continued)

(56) References Cited

U.S. PATENT DOCUMENTS 5,557,277 A *   9/1996   Tricoles .................. G01S 13/36
                                                        324/326
5,673,050 A *   9/1997   Moussally .......... G01S 13/0209
                                                        342/22
(Continued)

FOREIGN PATENT DOCUMENTS

CN       1013844899 A     11/2009
CN    201380056052.4       6/2016
(Continued)

OTHER PUBLICATIONS

Rebecca M Williams Et Al: "An autonomous robotic platform for ground penetrating radar surveys," IEEE Geoscience and Remote Sensing Society, Conference Dates Jul. 22-27, 2012.
(Continued)

*Primary Examiner* — Marcus E Windrich
(74) *Attorney, Agent, or Firm* — Willis IP; Ryan Willis

(57) ABSTRACT

A method and apparatus for inspecting cooling tower fill pack to detect the presence of fouling, wherein the method comprises using ground penetrating radar (GPR). The method comprises transmitting GPR to the fill pack and detecting reflected radar signals from the fill pack. A method of cleaning fouling from a cooling tower, comprising the steps of: inspecting the cooling tower fill pack with ground penetrating radar (GPR); identifying those parts of the fill pack in which unacceptable levels of fouling are present; and cleaning the parts so identified is also presented.

17 Claims, 4 Drawing Sheets

(51) Int. Cl.
*F28F 19/00* (2006.01)
*F28F 25/00* (2006.01)
*F28F 27/00* (2006.01)
*G01S 13/88* (2006.01)
*F28G 15/00* (2006.01)

(58) Field of Classification Search
USPC .......................................... 342/22, 176, 191
See application file for complete search history.

(56) References Cited

U.S. PATENT DOCUMENTS

| | | | | |
|---|---|---|---|---|
| 5,858,219 | A * | 1/1999 | Kusmierz | C02F 1/4602 210/167.3 |
| 6,626,078 | B2 * | 9/2003 | Thornton | F41H 11/12 102/402 |
| 6,667,709 | B1 * | 12/2003 | Hansen | G01S 13/86 324/326 |
| 6,864,826 | B1 * | 3/2005 | Stove | G01N 22/00 342/134 |
| 6,950,054 | B1 * | 9/2005 | Steinway | G01S 7/412 342/173 |
| 7,443,154 | B1 | 10/2008 | Merewether et al. | |
| 7,755,360 | B1 | 7/2010 | Martin | |
| 2007/0090989 | A1 * | 4/2007 | Weil | G01S 13/89 342/22 |
| 2010/0139995 | A1 | 6/2010 | Rudakevych | |
| 2010/0229953 | A1 * | 9/2010 | Stuart | B01F 3/0865 137/1 |
| 2011/0083599 | A1 | 4/2011 | Kornstein et al. | |
| 2011/0301785 | A1 | 12/2011 | Sword | |
| 2012/0280849 | A1 * | 11/2012 | Chang | G01V 3/12 342/22 |
| 2013/0050008 | A1 * | 2/2013 | Atkins | G01S 13/89 342/22 |
| 2014/0062754 | A1 * | 3/2014 | Mohamadi | F41H 11/136 342/22 |

FOREIGN PATENT DOCUMENTS

| | | |
|---|---|---|
| JP | 2003156571 | 5/2003 |
| JP | 2008076386 | 4/2008 |
| WO | PCT/GB13/52857 | 5/1974 |
| WO | WO 1994/29744 | 12/1994 |
| WO | WO 2001/60718 | 8/2001 |
| WO | WO 2012/50612 | 4/2012 |

OTHER PUBLICATIONS

Atindra K Mitra: "Ground-UAV platform geometries for radar imaging," Aerospace and Electronics Conference (NAECON), IEEE 2010 National Conference, Jul. 14-16, 2010.

Wallhuer E Et Al: "Detection methods of fouling in heat exchangers in the food industry," Food Control, vol. 27, Issue 1, Sep. 2012.

An Autonomous Robotic Platform for Ground Penetrating Radar Surveys, Rebecca M. Williams et al., Geoscience and Remote Sensing Symposium, pp. 3174-3177, Jul. 22, 2012.

Disposal Circular Water System, Wen Yuan Zhou et al., Turbine Technology, Oct. 2005.

* cited by examiner

METHOD AND APPARATUS FOR INSPECTION OF COOLING TOWERS

CROSS REFERENCE TO RELATED APPLICATIONS

This application claims priority under 35 U.S.C. § 119 to United Kingdom patent application serial number 1219764.6, filed Nov. 2, 2012, and to Patent Cooperation Treaty application serial number PCT/GB13/52857, filed Nov. 1, 2013, the disclosures of each of which are incorporated herein by reference.

FIELD OF THE INVENTION

This invention relates to a method and apparatus for the inspection of cooling towers to detect and map areas of fouling, and to a method of cleaning cooling towers.

BACKGROUND OF THE INVENTION

The following description will refer particularly to large, natural draft cooling towers of hyperbolic shape, such as are commonly used in power stations. However, the invention is also applicable to other types of cooling tower, such as forced or induced draft cooling towers.

In a cooling tower, process water is passed downwardly against a counter-flow of cooling air. The water is typically distributed by pipes across the top surface of a packing or fill pack. The fill pack is present to break up the water into droplets so as to produce a large surface area of water for contact with the cooling air, and the fill pack typically consists of plastic tubes and flutes.

Over time, fouling builds up in the fill pack. The fouling consists of scale from minerals and organic matter precipitated from the process water, and biological fouling consisting for example of algae and bacteria. The fouling reduces the available flow area and thus efficiency, and is also a potential health hazard. Periodic cleaning of the fill pack is therefore necessary.

Traditionally, due to difficulties in accessing, removing and cleaning the fill pack, towers have often become exponentially fouled. Techniques for combatting this have focused on on-going water treatment/dosing and/or filtration; these can act to slow down fouling but essentially only limit the rate of build-up. Traditional methods of cleaning have involved pack removal and high pressure jetting; this has problems such as damage to the fill pack during removal, erection of containment areas to limit bacterial spread, and issues of time and cost.

Experience has shown that cooling tower users desire an ability to gauge the level of fouling over time. This information can allow better interim management and decision making as to maintenance options. Hitherto this has been attempted by removal of pack sections for visual inspection, and removal and in-situ pack weighing. More recently, endoscopic techniques have been used to visually check pack flutes for deposition. These all have some utility but each has drawbacks, notably that they all check isolated sections to act as representative for the entire tower.

The present invention seeks to overcome or mitigate these problems.

SUMMARY OF THE INVENTION

The present invention provides a method of inspecting cooling tower fill pack to detect the presence of fouling, the method comprising the use of ground penetrating radar (GPR).

The invention is based on the unexpected discovery that ground penetrating radar can provide useful, accurate data in a structure which consists largely of void. This is in contrast to the usual applications of GPR such as inspection of concrete structures and archaeology, where the volume under inspection is entirely or largely solid.

In one embodiment, a GPR apparatus is moved across a top surface of the fill pack, for example being traversed across the top of the fill pack in a series of parallel scan lines.

In another embodiment, a GPR apparatus is moved relative to a surface of the fill pack. The surface may be a top surface, bottom surface or side surface of the fill pack.

The GPR apparatus may be substantially in contact with the surface of the fill pack. Alternatively, the GPR apparatus may be spaced from the surface of the fill pack. In this arrangement the GPR apparatus is not in contact with the fill pack.

The GPR apparatus may be mounted on a remotely operable vehicle (ROV), suitably a tracked vehicle. The GPR apparatus may be a hand-operated apparatus. In this arrangement the GPR apparatus may be carried by hand by the operating personnel, and the operating personnel may move across the surface of the fill pack.

The GPR apparatus may be mounted on a remotely operable vehicle (ROV). The ROV may be radio-controlled and/or controlled-by-wire.

The ROV may be a wheeled vehicle. The ROV may be a tracked vehicle. The ROV may be a vehicle capable of flying. The ROV may be a floating vehicle. The ROV may be a helicopter. The ROV may be an aeroplane.

The ROV may also mount a data logger arranged to store GPR data for subsequent downloading and analysis and may be provided with a video camera.

The ROV may also mount a data logger arranged to store GPR data for subsequent downloading and analysis.

The ROV may also be provided with a video camera.

The method may include the step of processing received GPR data to form a three-dimensional plot of the location and degree of fouling within the fill pack.

The step of processing the received GPR data to form a three-dimensional plot of the location and degree of fouling within the fill pack may include the step of distinguishing the fill pack from the fouling thereon. The step may include filtering, ignoring or deleting received data relating to the fill pack. The GPR apparatus may be configurable to identify/recognise and ignore the fill pack structure itself via the programming of appropriate relative densities or dielectric constants for the particular materials of construction of the fill pack. In this arrangement the GPR apparatus may be configurable to recognise a fill pack that is made of plastic, polyvinyl chloride (PVC), metal, asbestos, wood, or the like.

From another aspect, the invention provides a method of cleaning fouling from a cooling tower, comprising inspecting the cooling tower by the foregoing method, identifying those parts of the fill pack in which unacceptable levels of fouling are present, and cleaning the parts so identified.

From another aspect, the invention provides a method of targeted cleaning fouling from a cooling tower, comprising inspecting the cooling tower by the foregoing method, identifying those parts of the fill pack in which unacceptable levels of fouling are present, and cleaning the parts so identified.

The present invention also provides apparatus for use in inspecting cooling tower fill pack to detect the presence of fouling, the apparatus comprising a remotely operated vehicle (ROV) capable of traversing the surface of the fill pack without damage, and a ground penetrating radar (GPR) apparatus mounted on the ROV.

The present invention also provides an apparatus for inspecting cooling tower fill pack to detect the presence of fouling, the apparatus comprising a remotely operated vehicle (ROV) capable of moving relative to the surface of the fill pack, and a ground penetrating radar (GPR) apparatus mounted on the ROV.

The ROV may be configured such that it is capable of moving relative to the surface of the fill pack without damaging the fill pack.

The ROV is preferably a tracked vehicle.

The ROV may be radio-controlled and/or controlled-by-wire.

The ROV may be a wheeled vehicle. The ROV may be a tracked vehicle.

The ROV may be a vehicle capable of flying. The ROV may be a floating vehicle. The ROV may be a helicopter. The ROV may be an aeroplane.

Preferably, the ROV also mounts a data logger arranged to store GPR data for subsequent downloading and analysis.

In one embodiment, the ROV is provided with a video camera.

The GPR apparatus may be moved across a top surface of the fill pack.

The GPR apparatus may be traversed across the top of the fill pack in a series of parallel scan lines.

The GPR apparatus may be mounted on a remotely controlled vehicle (ROV).

The ROV may be a tracked vehicle.

The ROV may also mount a data logger arranged to store GPR data for subsequent downloading and analysis.

The ROV may be provided with a video camera.

BRIEF DESCRIPTION OF THE DRAWINGS

An embodiment of the invention will now be described, by way of example only, with reference to the drawings, in which.

DETAILED DESCRIPTION

Figure 1:
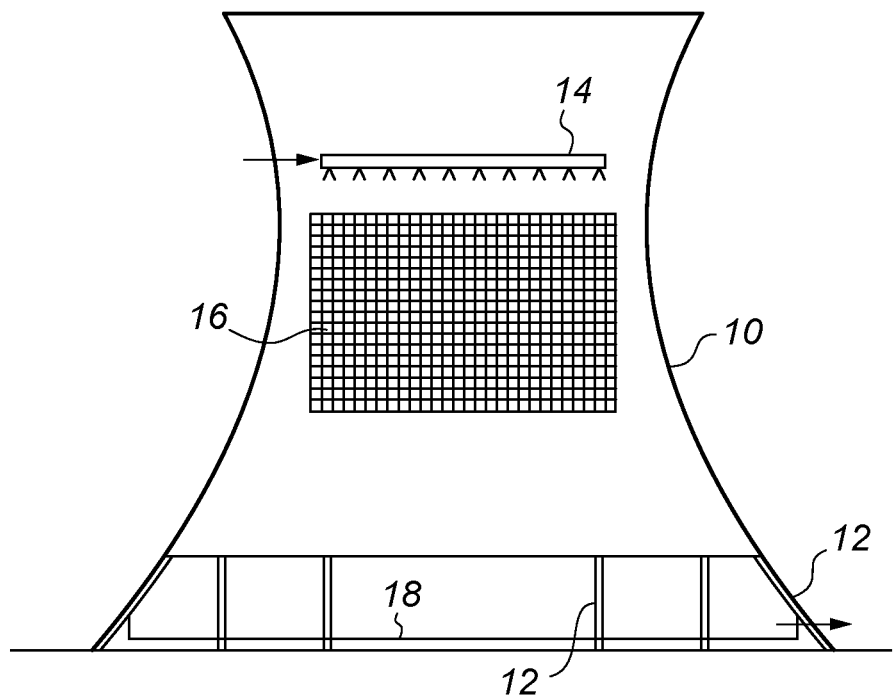
FIG. 1 is a diagrammatic cross-section of one form of cooling tower.

Referring to FIG. 1, one form of cooling tower comprises a parabolic concrete shell 10 supported clear of the ground on pillars 12. Process water to be cooled is distributed via pipes 14 and sprayed onto and through a volume of fill pack 16, finally collecting in a pond or sump 18 for re-use or discharge.

Figure 2:
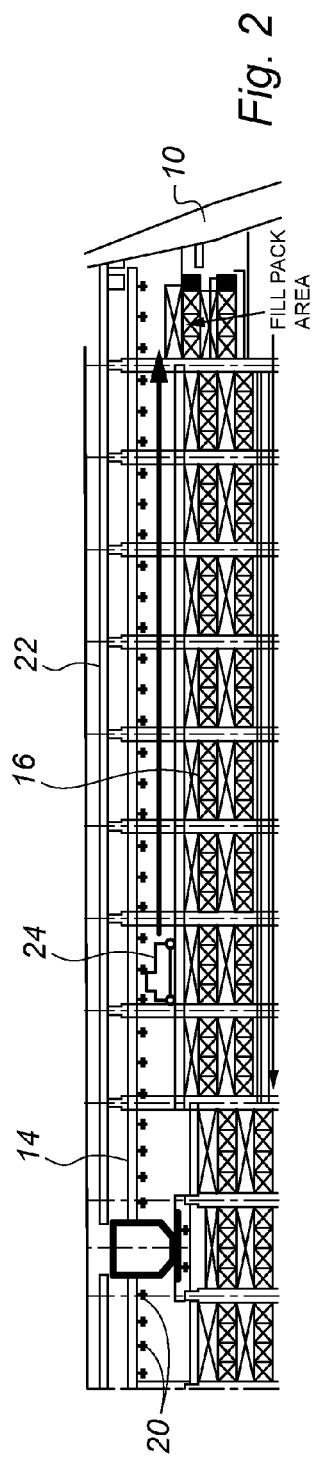
FIG. 2 is a partial cross-section, to an enlarged scale, of the cooling tower of FIG. 1.

FIG. 2 shows part of the cooling tower in more detail. It will be seen that distribution pipe 14 is provided with spray nozzles 20. Drift eliminators 22 are positioned above the pipes 14.

Figure 3:
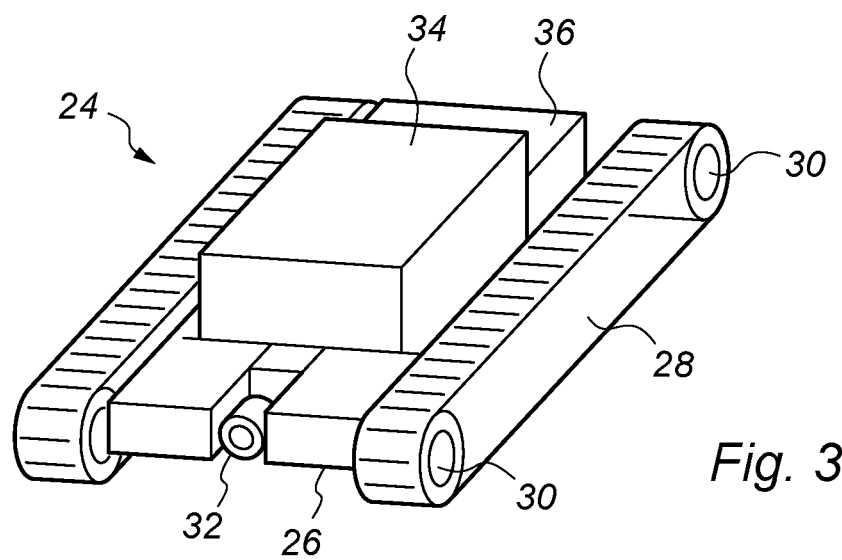
FIG. 3 is a perspective view of a remotely operated vehicle used in this embodiment.

The method of the invention is preferably carried out by a remotely operated vehicle (ROV) 24. Any suitable ROV may be used; one suitable example is the HD2 Robot by Superdroid Robots Inc. of Fuquay Varina, N.C. This is illustrated schematically in FIG. 3, and comprises a chassis 26 carried by rubber tracks 28 driven by motors 30. A video camera 32 is mounted at the front of the ROV 24 and can be tilted by a tilt motor (not shown). The motors 30 are provided with encoders which give a measure of distance moved. The ROV 24 is controlled by a remote radio control unit with one joystick to control forward/reverse and steering and another joystick to control camera tilt.

The ROV 24 carries a GPR apparatus 34 and a data logger 36. One example of a suitable GPR apparatus is the GSSI TerraSIRch SIR System 3000 (commonly referred to as SIR-3000) by Geophysical Survey Systems, Inc. of Salem, N.H. The same company provides a suitable data logger. However, any suitable form of GPR apparatus may be used.

A preferred frequency for this use is an antenna frequency of 400 MHz, although other frequencies may be suitable. The preferred mode of GPR operation is distance based collection. This associates the scans with a linear distance, and is required to produce a 3D model. The motor encoders provide data on horizontal distance traveled for production of the 3D model; however alternative distance inputs are possible, for example a manually pushed GPR apparatus could be provided with a trundle wheel or the like. The GPR apparatus 34 could be used in time mode for ad hoc scanning, which could be useful in terms of information on a manually input distance.

Figure 5:
FIG. 5 is a plan view of one-quarter of the fill pack showing the path of the remotely operated vehicle.
Figure 4:
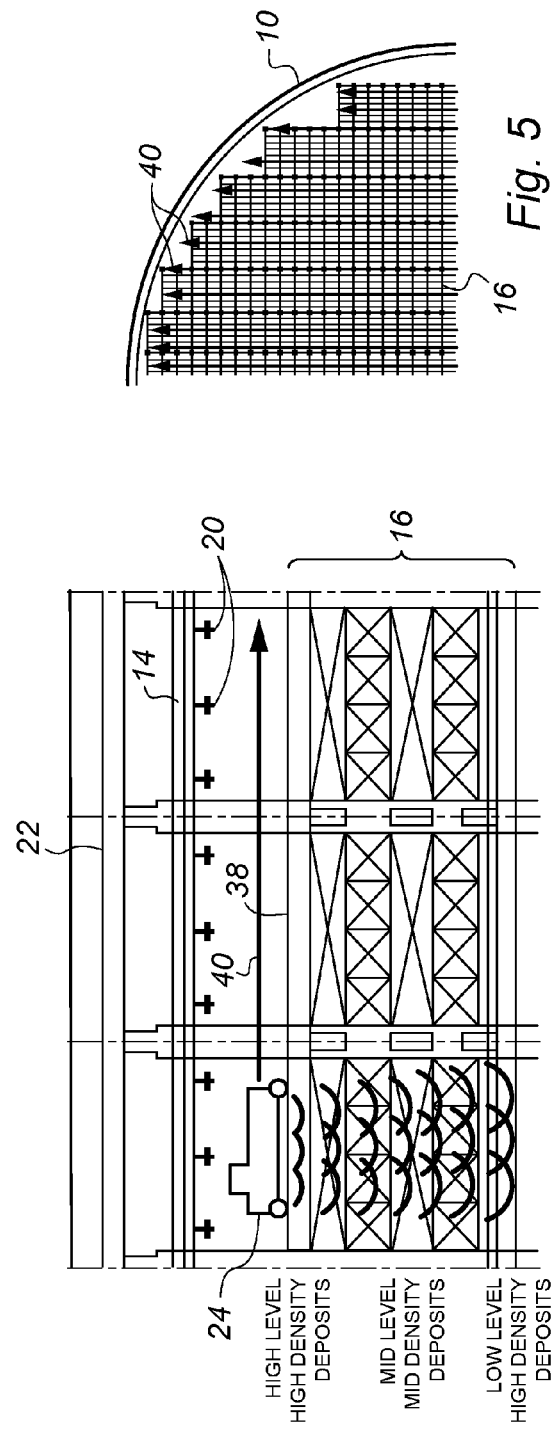
FIG. 4 is a side view illustrating operation of the remotely operated vehicle.

Referring now to FIGS. 4 and 5, in use the operating personnel access the top surface 38 of the fill pack 16. The ROV 24 is positioned on the top surface 38 and is driven across it in a series of straight-line scans 40. It will typically be convenient to direct the ROV 24 from the centre to the periphery, reverse it back to the centre, move it sideways, and repeat the procedure. In doing this, it may be convenient to set up a series of aiming marks at the periphery. However, other scanning patterns are possible. For example, the ROV on reaching the periphery could be steered a short distance around the periphery and driven back to the centre along a parallel line; or a spiral scan could be used.

Figure 6:
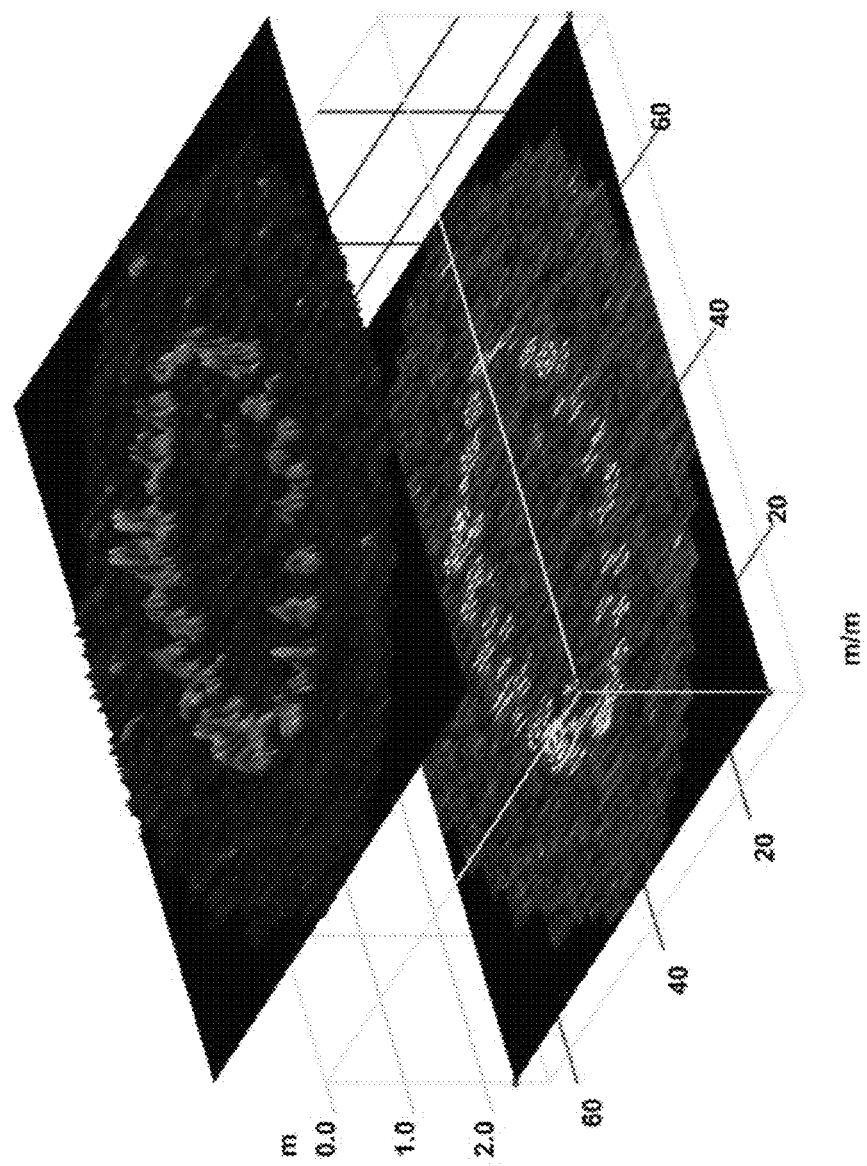
FIG. 6 is an exemplary three-dimensional plot of a location and degree of fouling within a fill pack that reflects fouling with axial units in meters.
Figure 7:
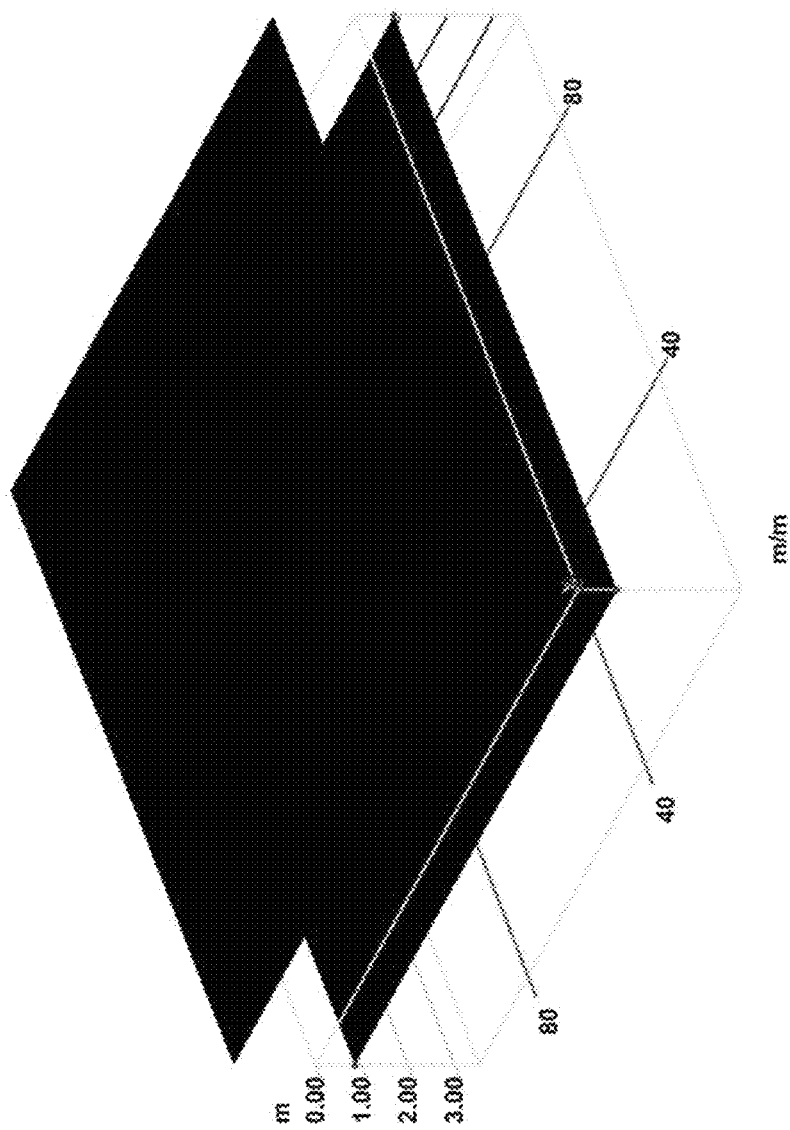
FIG. 7 is an exemplary three-dimensional plot of a location and degree of fouling within a fill pack that reflects an absence of fouling with axial units in meters.

On each scan GPR data is stored in the data logger 36. As in normal GPR use, the radar echo varies at surfaces or discontinuities between media of different density, and the time of receipt defines the depth. The data is subsequently downloaded to a computer which generates a 3D map indicating the degree of fouling at each location using individual scan data slices. FIG. 6 depicts an exemplary 3D plot of location and degree of fouling within the fill pack 16, where fouling is present. Alternatively, FIG. 7 depicts an exemplary 3D plot of location and degree of fouling within the fill pack 16, where fouling is absent. The GPR apparatus is configured to recognise and ignore the fill pack structure itself via the programming of appropriate relative densities or dielectric constants for the particular materials of construction. The generation and interpretation of the 3D map is similar to those used in underground or structural surveys and will be apparent to one of ordinary skill in using GPR. Using the 3D map, the GPR data may be quantified using borescope inspection methods known to those skilled in the art. A user may identify points of interest within the tower from each scan and then quantify or confirm what degree of fouling the retrieved data from the scan relates to. For example, points of interest may lead to inspection or cleaning of the tower as needed. There is no defined threshold as to when cleaning is necessary as this is discretionary.

Once this information is available, a determination can be made as to the cleanliness of different parts of the fill pack 16 require to be cleaned. It may be useful also to inspect selected areas of the fill pack with an endoscope in order to correlate the GPR signals visually with the degree of fouling. The procedure allows for a more targeted and efficient cleaning process; for example there could be three repeated treatments in one area and only a single treatment in another.

The present invention thus provides an improved method of inspection of cooling towers. The invention enables a more complete survey of the fill pack, not simply parts of it, and this can be done without disassembly and re-assembly of the fill pack.

While this invention has been described with reference to the sample embodiments thereof, it will be appreciated by those of ordinary skill in the art that modifications can be made to the structure and elements of the invention without departing from the spirit and scope of the invention as a whole.

Furthermore, although in the method of inspecting cooling tower fill pack illustrated and described above the ROV 24 has been described as being a tracked vehicle that rides on the top surface of the fill pack 16, it should be appreciated that the ROV may not necessarily have to be a tracked vehicle that rides on the top surface of the fill pack 16. For example, the ROV does not have to operate on the top surface of the fill pack 16. The ROV may be moved relative to any surface of the fill pack 16, e.g. the top surface, bottom surface or a side surface. Furthermore, the ROV does not have to be in contact with the surface itself. The ROV may, for example, be spaced from the surface of the fill pack 16. That is, there may be a gap between the ROV and the surface of the fill pack 16.

Also, although the ROV 24 has been illustrated and described above as being a tracked vehicle, it should be appreciated that the ROV may be a wheeled vehicle, a vehicle capable of flying or a vehicle capable of floating. In the instance where the ROV is a vehicle capable of flying, the vehicle may be an aeroplane or a helicopter, or the like. In the instance where the ROV is a vehicle capable of floating, the ROV may be a powered boat, or powered vessel, which may be located in the pond or sump 18. In this instance the ROV would scan, or be operative with, the lower (bottom) surface of the fill pack 16.

Again, the motor encoders of the ROV provide data on horizontal distance traveled for production of the 3D model; however alternative distance inputs are possible, for example a manually pushed apparatus could be provided with a trundle wheel or the like. The apparatus could be used in time mode for ad hoc scanning, which could be useful in terms of information on a manually input distance.

In use the operating personnel access the top surface 38 of the fill pack 16. The ROV 24 is positioned on the top surface 38 and is driven across it in a series of straight-line scans 40. It will typically be convenient to direct the ROV 24 from the centre to the periphery, reverse it back to the centre, move it sideways, and repeat the procedure. In doing this, it may be convenient to set up a series of aiming marks at the periphery. However, other scanning patterns are possible. For example, the ROV on reaching the periphery could be steered a short distance around the periphery and driven back to the centre along a parallel line; or a spiral scan could be used.

The invention claimed is:

1. A method of inspecting cooling tower fill pack to detect the presence of fouling, the method comprising:
   providing a ground penetrating radar (GPR) apparatus;
   moving the GPR apparatus relative to a top surface, a bottom surface, or a side surface of the fill pack; and
   processing received GPR data to form a three-dimensional plot of a location and degree of fouling within the fill pack;
   wherein the step of processing the received GPR data to form the three-dimensional plot of the location and degree of fouling within the fill pack includes the step of distinguishing the fill pack from the fouling thereon; and,
   wherein the GPR apparatus is configurable to identify or recognise and ignore the fill pack itself via programming of appropriate relative densities or dielectric constants for the particular materials of construction of the fill pack.

2. The method according to claim 1, wherein the mode of operation of the GPR is distance-based data collection.

3. The method according to claim 1, in which the GPR apparatus is traversed across the top of the fill pack in a series of parallel scan lines.

4. The method according to claim 1, in which the GPR apparatus is mounted on a remotely operable vehicle (ROV).

5. The method according to claim 4, in which the ROV is a tracked vehicle, a wheeled vehicle, a vehicle capable of flying, or a vehicle capable of floating.

6. The method according to claim 4, in which the ROV also mounts a data logger arranged to store GPR data for subsequent downloading and analysis.

7. The method according to claim 4, in which the ROV is provided with a video camera.

8. The method of claim 1, wherein the method includes filtering, ignoring and/or deleting received data relating to the fill pack.

9. The method of claim 1, wherein the step of processing the received GPR data to form the three-dimensional plot of the location and degree of fouling within the fill pack includes analysing the received GPR data to aid determination of deposition type and make-up of the fouling.

10. The method of claim 1, wherein the GPR apparatus is a hand-held apparatus.

11. A method of cleaning fouling from a cooling tower, comprising the steps of:
    providing a ground penetrating radar (GPR) apparatus;
    inspecting a cooling tower fill pack of the cooling tower with GPR by moving the GPR apparatus relative to a top surface, a bottom surface, or a side surface of the fill pack;
    processing received GPR data to form a three-dimensional plot of a location and degree of fouling within the fill pack;
    identifying those parts of the fill pack in which unacceptable levels of fouling are present; and
    cleaning the parts so identified;
    wherein the step of processing the received GPR data to form the three-dimensional plot of the location and degree of fouling within the fill pack includes the step of distinguishing the fill pack from the fouling thereon; and,
    wherein the GPR apparatus is configurable to identify or recognise and ignore the fill pack itself via programming of appropriate relative densities or dielectric constants for the particular materials of construction of the fill pack.

12. An apparatus for inspecting cooling tower fill pack to detect the presence of fouling, the apparatus comprising a remotely operable vehicle (ROV) capable of traversing a surface of the fill pack without damage, and a ground penetrating radar (GPR) apparatus mounted on the ROV, characterized in that the GPR apparatus is configured to process received GPR data to form a three-dimensional plot of a location and degree of fouling within the fill pack and distinguish the fill pack from the fouling thereon, wherein the GPR apparatus is configurable to identify or recognise and ignore the fill pack itself via programming of appropriate relative densities or dielectric constants for the particular materials of construction of the fill pack.

13. The apparatus according to claim 12, wherein the ROV is a tracked vehicle.

14. The apparatus according to claim 12, wherein the ROV is radio-controlled, or controlled-by-wire.

15. The apparatus according to claim 12, wherein the ROV is a wheeled vehicle, a tracked vehicle, a vehicle capable of flying, or a floating vehicle.

16. The apparatus according to claim 15, wherein the ROV includes a data logger arranged to store GPR data for subsequent downloading and analysis.

17. The apparatus of claim 12, wherein the ROV is provided with a video camera.

* * * * *